United States Patent
Modi et al.

(10) Patent No.: US 10,062,249 B1
(45) Date of Patent: Aug. 28, 2018

(54) SYSTEMS AND METHODS OF TAMPER DETECTION

(71) Applicant: Google LLC, Mountain View, CA (US)

(72) Inventors: Yash Modi, San Mateo, CA (US); Conor O'Neill, Mountain View, CA (US); Shao-Po Ma, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/798,446

(22) Filed: Oct. 31, 2017

(51) Int. Cl.
  *G08B 13/08* (2006.01)
  *G01P 15/18* (2013.01)

(52) U.S. Cl.
  CPC .............. *G08B 13/08* (2013.01); *G01P 15/18* (2013.01)

(58) Field of Classification Search
  None
  See application file for complete search history.

(56) References Cited

U.S. PATENT DOCUMENTS

| | | | | |
|---|---|---|---|---|
| 4,543,458 A * | 9/1985 | Holce | ................ | H01H 36/0046 200/61.7 |
| 4,750,197 A * | 6/1988 | Denekamp | ............. | G07C 5/008 235/375 |
| 5,748,083 A * | 5/1998 | Rietkerk | ............... | G08B 13/128 340/568.2 |
| 2016/0074912 A1* | 3/2016 | Kogure | .................. | A61B 1/123 134/56 R |

\* cited by examiner

*Primary Examiner* — Brent Swarthout
(74) *Attorney, Agent, or Firm* — Morris & Kamlay LLP

(57) ABSTRACT

Systems and methods are provided for determining, at a controller of a device of a premises management system having a head unit and a backplate, at least a partial removal of the head unit from the backplate based on a position of a removal switch that detects connectivity between the head unit and the backplate. When the controller determines that the position of the removal switch is in an open position, an orientation of the head unit may be continuously determined based on an output signal from an accelerometer coupled to the head unit. A tampering signal is output based on the open position of the backplate removal switch and the determined orientation of the head unit.

20 Claims, 6 Drawing Sheets

SYSTEMS AND METHODS OF TAMPER DETECTION

BACKGROUND

Devices that are part of a security system for a premises are used to detect motion of doors, windows, and the like. A backplate of the device is mounted to the door or window, and the head unit of the device is correspondingly mounted to the backplate. Typically, the device has a simple switch to detect detachment of the head unit from the corresponding backplate. The position of the switch is used to detect tampering of the device when the head unit is dislodged from the backplate. However, tamper signals output from the device based on the switch position typically may generate false positives, which are frequently related to mechanical or electrical connectivity issues with the switch or with the mounting of the head unit to the backplate. This results in false tamper notifications in the security system.

BRIEF SUMMARY

According to an implementation of the disclosed subject matter, a method may include determining, at a controller of a device of a premises management system having a head unit and a backplate, at least a partial removal of the head unit from the backplate based on a position of a removal switch that detects connectivity between the head unit and the backplate. When the controller determines that the position of the removal switch is in an open position, the controller may continuously determine an orientation of the head unit based on an output signal from an accelerometer coupled to the head unit. The method may include outputting, at the controller, a tampering signal based on the open position of the backplate removal switch and the determined orientation of the head unit.

According to an implementation of the disclosed subject matter, a device of a premises management system may include a head unit coupled to a backplate. A removal switch may detect connectivity between the head unit and the backplate. An accelerometer may determine an orientation of the head unit. A controller may determine at least a partial removal of the head unit from the backplate based on a position of the removal switch. When the controller determines that the position of the removal switch is in an open position, the controller may continuously determine an orientation of the head unit based on an output signal from an accelerometer. The controller may output a tampering signal based on the open position of the backplate removal switch and the determined orientation of the head unit.

According to an implementation of the disclosed subject matter, means for detecting tampering of a device of a premises management system are provided, including means for determining at least a partial removal of a head unit from a backplate of a device of the premises management system based on a position of a removal switch that detects connectivity between the head unit and the backplate. When it is determined that the position of the removal switch is in an open position, an orientation of the head unit may be continuously determined based on an output signal from an accelerometer coupled to the head unit. The implementation may include means for outputting a tampering signal based on the open position of the backplate removal switch and the determined orientation of the head unit.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
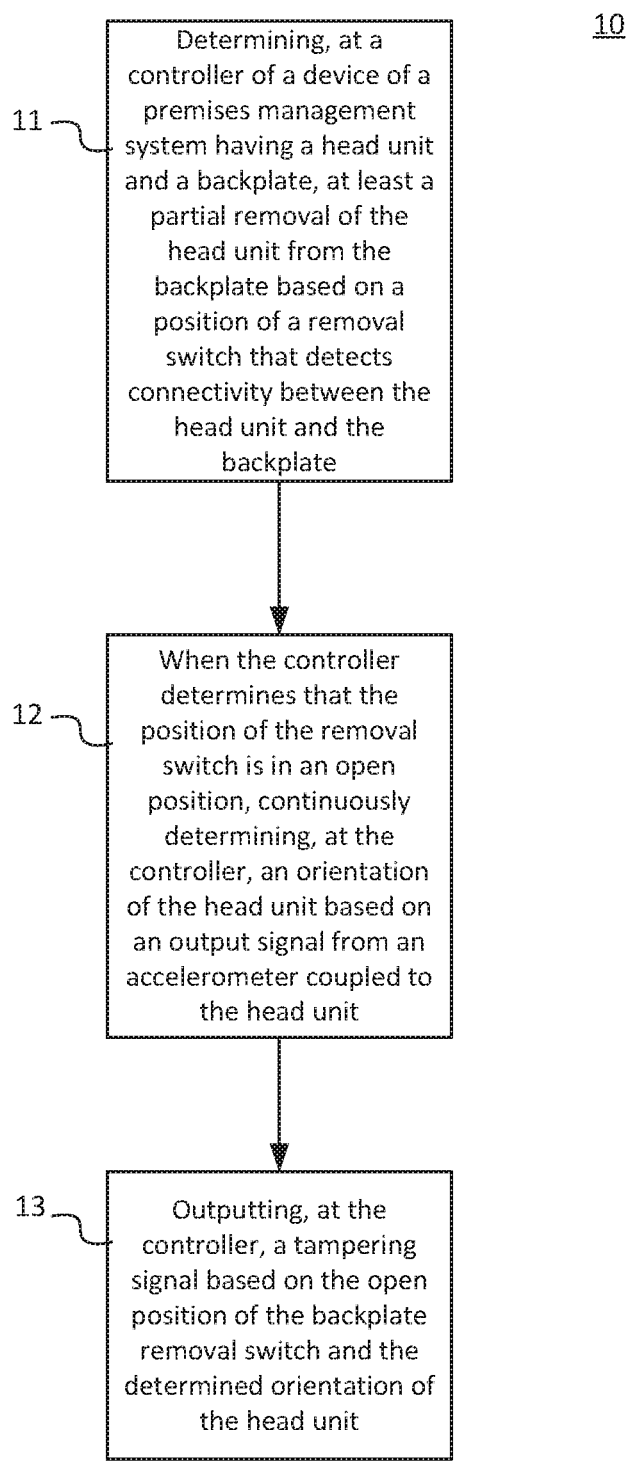
FIG. 1 shows a method of determining whether a device of a premises management system has been tampered with according to an implementation of the disclosed subject matter.

Implementations of the disclosed subject matter provide systems and methods of reducing false positives in tamper detection for a device of a premises management system, which may include a security system and/or home network. The systems and methods may include accurately determining tampering by using an accelerometer-based orientation filter to determine dislodgement and/or detachment of a head unit of a device from a backplate to which it is typically mounted. That is, implementations of the disclosed subject matter may use one or more sensors, such as an accelerometer, in conjunction with a backplate removal switch to increase accuracy of tamper detection, and reduce false positives.

Typically, in devices that are coupled to a security management system or a smart home network, a simple switch is used to detect detachment of a head unit from a backplate. However, such simple switches on backplates tend to have false positives, where a false tamper may be signaled, even while a head unit associated with the backplate is still attached. These false tamper signals generally occur due to mechanical issues or hardware issues, such as a bad electrical contact. Mechanical issues that typically cause false tamper signals with a device include knocking on a door, vibration or force to a wall or window, slamming a door shut, or the like. Such mechanical issues can increase the number and/or likelihood of the bad contacts between the head unit and backplate at the backplate switch, resulting in the generation of false tamper notifications. For a security system, the tamper signal is used for alarming, and thus these could result in false alarms.

A general approach to dealing with such false tampering signals is debouncing, which removes the 'spikes' from an output signal from the backplate switch. The spikes may result from the moving of the switch position between open and closed positions because of bad electrical contacts, noise, and/or vibration. However, adding debounces changes the latency of 'true' tampering signals (i.e., signals for an actual tampering event, and not a false positive event). That is, a backplate switch output signal that represents a true tamper signal may experience latency because of the debouncing, which delays the receipt of the true tamper signal by the premises management system which outputs an alarm and/or a notification. Moreover, not all false tampering signals may be rejected with debouncing, such as when the false state is 'sticky.' For example, a device may be affixed to a door, and force may be applied to the door (e.g., a door knock) which may cause the tamper switch to stick to the wrong state for tens of seconds. Debounce processing would not accurately filter for this type of 'sticky' switch.

In implementations of the disclosed subject matter, accelerometers and/or other sensors may be used in conjunction with a backplate switch so as to reduce false tampering signals. When a device of the security system is tampered with, the orientation of the device may change (e.g., the orientation of the device may be changed so as to meet and/or exceed a predetermined threshold). Implementations of the disclosed subject matter may determine changes to the orientation of a head unit of a device, and report a tamper when the orientation has changed (e.g., when the orientation or change thereof meets and/or exceeds a predetermined threshold). The orientation of the head unit may be determined using the accelerometer or other sensor(s) when the backplate switch registers an open position.

That is, implementations of the disclosed subject matter may have a backplate switch that may generate a backplate detach signal, and the implementations may use a signal from an orientation detector (e.g., an accelerometer) to accurately determine when a head unit has been dislodged and/or removed from a backplate. The combination of signals may be used to account for latency (e.g., when a person changes the orientation of the head unit of the device slowly, such as at a rate that is below a predetermined rate), and may provide increased accuracy (in comparison to only using a backplate switch or only using an orientation). In implementations of the disclosed subject matter, the orientation detector may be used when the backplate switch transitions to open and/or is still in an open position.

Implementations of the disclosed subject matter may track the position of a backplate switch. The position of the switch may be tracked over a long term average (e.g., a time constant that may be 90 seconds or any suitable time range) of an acceleration vector that represents the switch position. When the backplate switch is determined to be open, the new orientation may be continuously determined using an accelerometer. This may be approximated by keeping a short term average (e.g., a time constant of one second or any other suitable time constant) of the acceleration vector. The change in the orientation may be approximated by taking the 1-norm between the two vectors (i.e., the sum of the absolute value of difference between each axis). When the change in orientation exceeds a predetermined value, the orientation of the head unit of a device may be deemed to be changed, and a tampering signal may be output to a control system of the premises management system.

In some implementations, other features in addition to and/or instead of the 1-norm may be used to determine a tampering event, such as use of the 2-norm, using the energy level of a signal (e.g., output from an accelerometer and/or other sensor device), and/or an increase in standard deviation. Machine learning by the premises management system may also be used to determine the range of motion that the device may experience during normal operation, and the device may output a tampering event signal when the range of motion (e.g., of the head unit) is outside of the learned range of motion.

In some implementations, a set representative of a trajectory of orientations may be learned and/or pre-stored for a device. The set may include the range of motion expected for a device. For example, the device may be mounted to a window or door, and the set may include the range of motion and orientation for the window as the window opens and closes. That is, the orientation may follow a particular 'channel,' and any orientations other than expected orientations could be flagged as a potential tampering by the orientation detector.

In some implementations, other inertial sensors may be used in conjunction with the backplate switch for tamper detection. For example, a gyroscope, a compass, and/or an inertial movement unit (IMU) may be used to detect changes from the static position of the device.

Figure 3A:
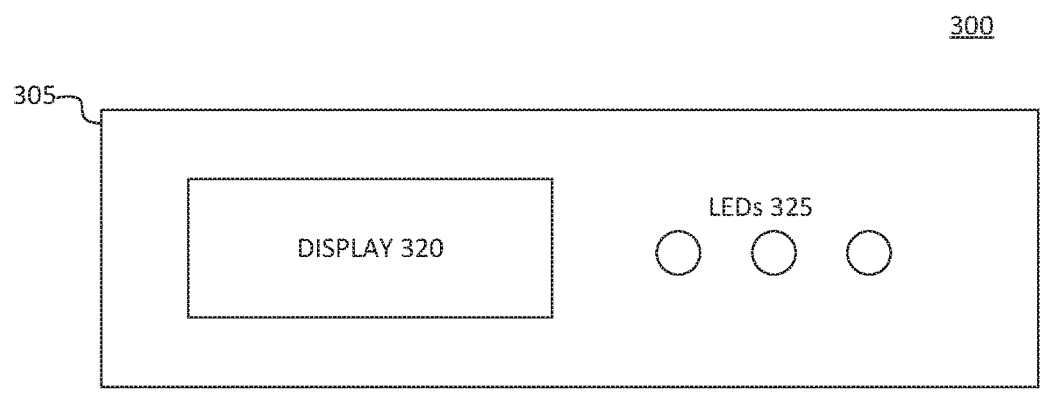
FIGS. 3A-3C show a device of a premises management system having a head unit and a backplate according to an implementation of the disclosed subject matter.
Figure 3B:
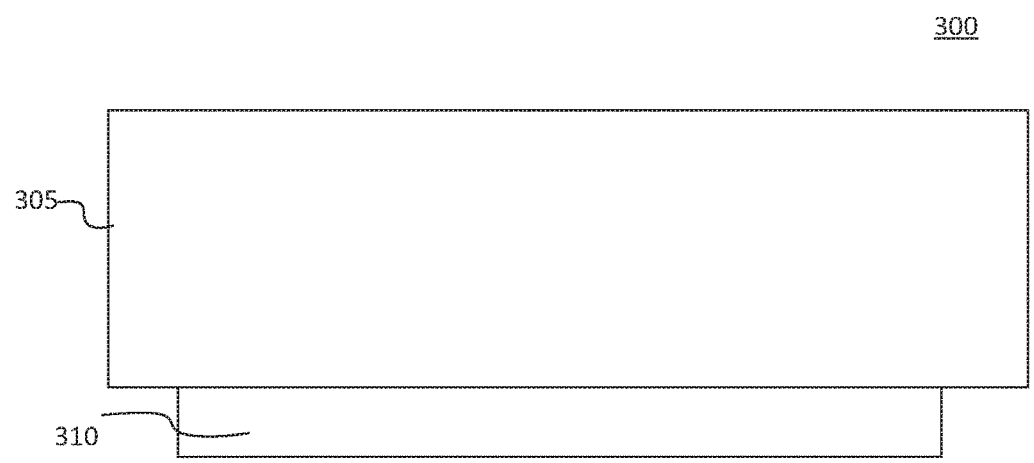
Figure 3C:
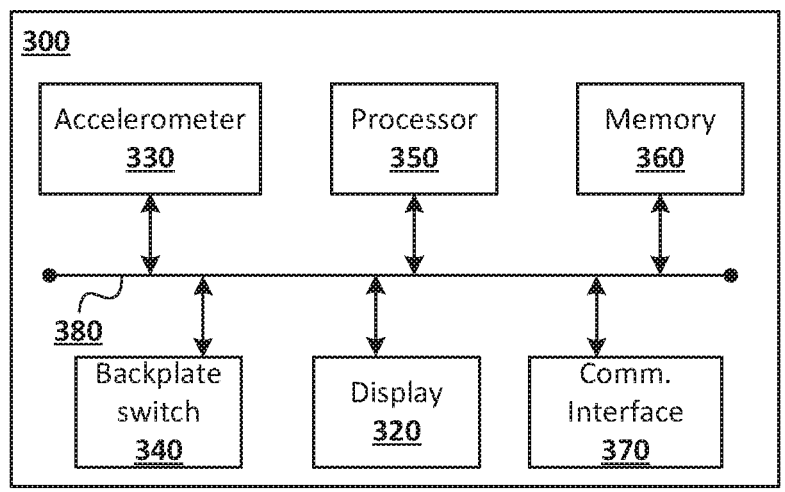

FIG. 1 shows a method 10 of determining whether a device of a premises management system has been tampered with according to an implementation of the disclosed subject matter. The device may be, for example, device 300 as shown in FIGS. 3A-3C and discussed in detail below. The device typically is mounted on a door, a window, or other entryway of a premises to detect motion of the door and/or window. The method 10 shown in FIG. 1 and described below may determine whether the device mounted on a door, a window, or other entryway is being tampered with.

The method 10 may include determining, at a controller of a device (e.g., processor 350 of device 300 shown in FIG. 3C, controller device 160 shown in FIG. 4, and/or processor 64 of computing device 60 shown in FIG. 5) of a premises management system having a head unit (e.g., head unit 305 shown in FIGS. 3A-3B) and a backplate (e.g., backplate 310 shown in FIG. 3B), at least a partial removal of the head unit from the backplate based on a position of a removal switch (e.g., backplate switch 340 shown in FIG. 3C) that detects connectivity between the head unit and the backplate at operation 11.

At operation 12, when the controller determines that the position of the removal switch is in an open position, the controller may continuously determine an orientation of the head unit based on an output signal from an accelerometer coupled to the head unit. In some implementations, method 200 shown in FIG. 2 and described below may be used to determine the orientation of the head unit.

At operation 13, the controller may output a tampering signal based on the open position of the backplate removal switch and the determined orientation of the head unit.

In some implementations, the controller may determine that the position of the removal switch is in a closed position by determining a first average of a first vector for a first predetermined period of time. The controller may determine the first vector based on an average of one or more signals from the removal switch regarding its position over the first predetermined period of time. That is, the first average may be the average of the signals from the removal switch. When the average of the signals indicates a closed position signal, the controller may determine that the removal switch is closed. Alternatively, when the average of the signals indicates an open position signal, the controller may determine that the removal switch is open.

The controller may continuously determine the orientation of the head unit for a second average of a second vector for a second period of time that is less than the first period of time. The controller may determine the second vector based on the average of one or more signals from the accelerometer of the head unit regarding its position over the second predetermined period of time.

The controller may determine a 1-norm between the first vector and the second vector. That is, a difference between the first and second vectors determined by the 1-norm may be used to determine whether the head unit is being tampered with. In some implementations, the 1-norm may be a sum of absolute differences (SAD) between the first and second vectors, which may be represented by the equation in the example detailed below. Accordingly, a tampering signal may be output when the determined 1-norm exceeds a predetermined threshold value.

For example, a 'slower' low pass filter may be constructed by setting the first predetermined period of time for a longer time period (e.g., 30 seconds, 60 seconds, 90 seconds, or the like) than that of the second period of time which may be set for one second, two seconds, five seconds, or the like as part of a 'faster' low pass filter. The 1-norm can be computed for a difference between the two vectors (e.g., the first vector and the second vector):

$$SAD(x_1, x_2) = \|x_1 - x_2\| = \Sigma |x_{1i} - x_{2i}|$$

That is, for vectors $x_1$ and $x_2$ (e.g., the first vector and the second vector), the 1-norm may be determined from the summation of the absolute values of the differences of the elements (e.g., $x_{1i}$, $x_{1i}$) of the vectors. This may determine the difference between the two vectors, which may be compared to a predetermined threshold vector difference. A tampering event may occur when the difference between the first and second vectors exceeds the predetermined threshold vector difference. That is, the difference between the vectors may be used to determine whether there is a 'true' tampering event, rather than a 'false' tampering event. When the difference between the two vectors is below the predetermine vector threshold difference, there may not be a 'true' tampering event, and thus it is undesirable to output alarms or notifications for an event which is not a 'true' tamper event. When the difference between the two vectors meets or exceeds the predetermined threshold vector difference, a notification and/or alarm may be output to indicate that a tampering event has occurred.

In some implementations, when the change in orientation of the head unit exceeds to a predetermined value, the tampering signal may be output from the controller based on the open position of the removal switch. When the tampering signal is output, a controller (e.g., a primary system processor 75 shown in FIG. 6) may output a notification to a user device (e.g., controller device 160 shown in FIG. 6 and/or computing device 20 shown in FIG. 7) and/or may output an alarm based on the tampering signal.

In some implementations, the orientation of the head unit may be continuously determined based on an output signal from one or more sensors, which may be a gyroscope, a compass, and an inertial movement unit (IMU), or the like.

In some implementations, when the controller is the processor 350 of device 300 shown in FIG. 3C, the processor 350 may determine whether the orientation of the head unit is within a predetermined range of orientations. The device 300 may output a notification via the communications interface 370 (e.g., to the primary system processor 75 and/or the controller device 160 shown in FIG. 6) when the determined orientation is outside of the predetermine range of orientations. The processor 350 may determine the predetermined range of orientations for the device based on a range of movement of the device in a mounted location.

Figure 4:
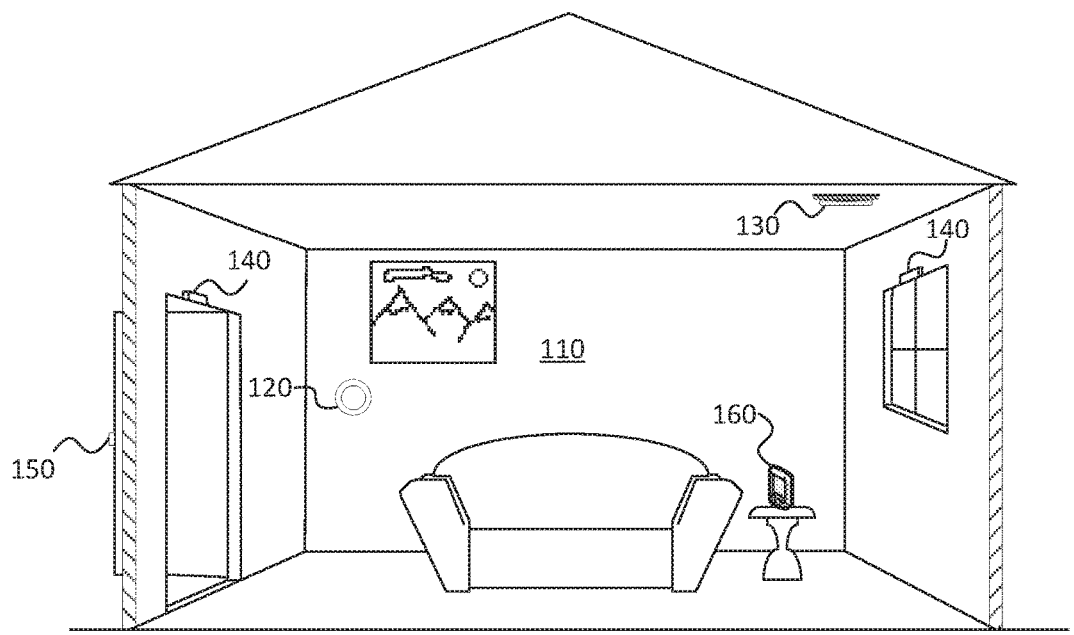
FIG. 4 shows a premises management system according to an implementation of the disclosed subject matter.
Figure 5:
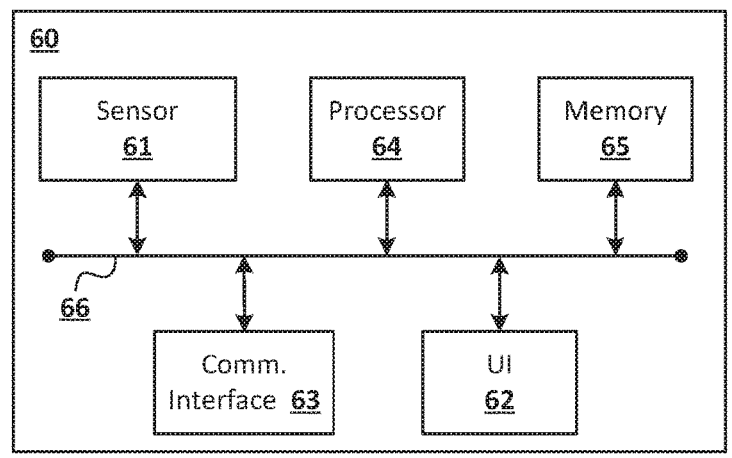
FIG. 5 shows a premises management device according to an implementation of the disclosed subject matter.

In some implementations, when the controller is the controller device 160 shown in FIG. 4 and/or processor 64 of computing device 60 shown in FIG. 5, the processor 64 may receive data via the communication interface 63 from the device 300 to determine whether the orientation of the head unit 305 is within a predetermined range of orientations. The controller device 160 and/or the computing device 60 may output a notification via the communications interface 63 to the primary system processor 75 and/or to the user interface 62 when the determined orientation is outside of the predetermine range of orientations. The processor 64 may determine the predetermined range of orientations for the device 300 based on a range of movement of the device in a mounted location.

Figure 2:
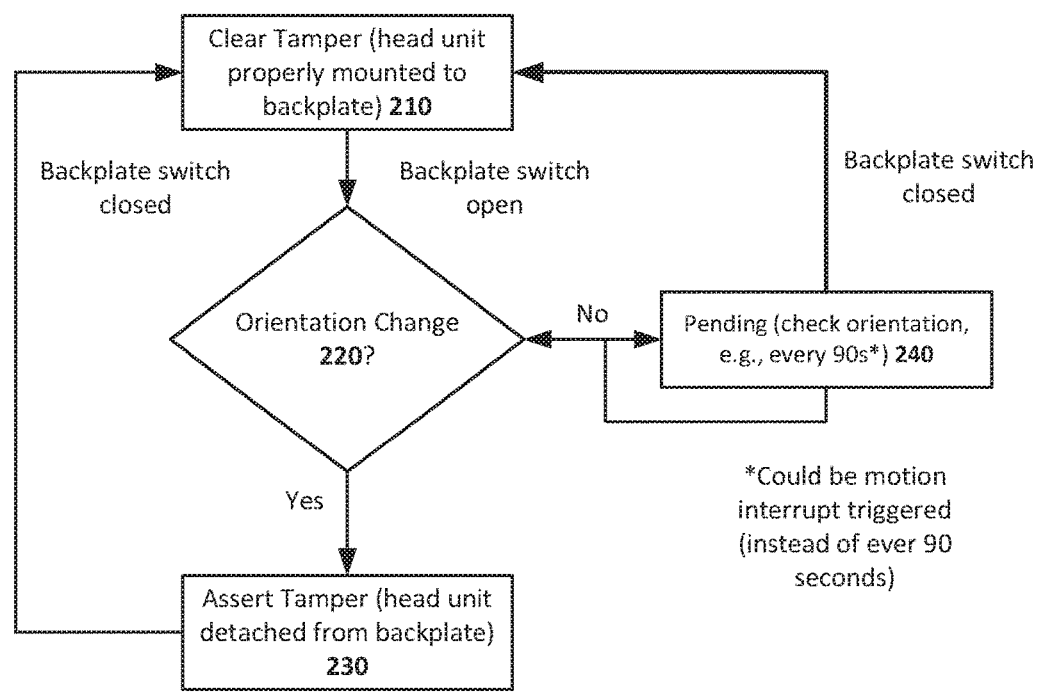
FIG. 2 shows a method of determining an orientation change of a device of premises management system according to an implementation of the disclosed subject matter.

FIG. 2 shows a method of determining an orientation change of a device of premises management system according to an implementation of the disclosed subject matter. At operation 210, the backplate switch (e.g., backplate switch 340 shown in FIG. 3C) may be in a closed position, and the head unit may be mounted to the backplate. For example, as shown in FIGS. 3B-3C, the head unit 305 may be mounted to backplate 310, such that the backplate switch 340 may be in a closed position.

At operation 220, the backplate switch may be determined to be open, and a controller (e.g., processor 350 shown in FIG. 3C, processor 64 of the computing device 60, and/or the controller device 160) of the device of the premises management system may determine whether there is a change in the orientation of the head unit. If it is determined that the orientation of the head unit has changed (e.g., such that the change in orientation exceeds a predetermined threshold value), the controller may determine that the head unit has been detached from the back plate at operation 230.

In some implementations, a notification may be sent to a user device and/or an alarm may be output. If the head unit is remounted on the backplate, the backplate switch may be closed, and the method 200 may return to operation 210, which may clear the tamper. If there is no change in the orientation of the head unit at operation 220, the orientation may be checked again at operation 240 after a predetermined period of time (e.g., every 30 seconds, every 60 seconds, every 90 seconds, and/or any other suitable length of time). In some implementations, the motion of the head unit may be used as a trigger to determine whether there is an orientation change. If the orientation of the head unit is changed after the predetermined period of time, or when the movement of the head unit triggers the change in orientation, operation 230 may determine that the head unit has been separated from the backplate. If there is no change in orientation after repeated checking at operation 240, the backplane switch may be determined to be closed, and the operation of method 200 may return to a clear tamper state (e.g., where the head unit is mounted to the backplate) at operation 210.

FIGS. 3A-3C show a device of a premises management system having a head unit and a backplate according to an implementation of the disclosed subject matter. The device 300 shown in FIGS. 3A-3C may include one or more sensors, and may be mounted in various locations of a premises. For example, the device 300 may be mounted on a door, a window, or other entryway of a premises to detect motion of the door and/or window. The tampering of the device 300 by a person may be an attempt to circumvent a security system portion of a premises management system.

FIG. 3A shows a device 300 of a premises management system that includes a head unit 305, which may include a display 320 and/or LEDs (light emitting diodes) 325 to display information related to the operation of the device 300. For example, the display 320 and/or the LEDs 325 may indicate whether the backplate switch (e.g., backplate switch 330) is in an open or closed position (e.g., thus indicating whether the head unit 305 is detached or attached to the backplate 310).

FIG. 3B is a side view of the device 300 of a premises management system having the head unit 305 and the backplate 310 according to an implementation of the disclosed subject matter. That is, FIG. 3B shows the view of the device 300 when the head unit 305 is coupled to the backplate 310.

FIG. 3C shows the device 300 of a premises management system according to an implementation of the disclosed subject matter. The device 300 may include a backplate switch 340, which may be in a closed position when the head unit 305 is mounted to the backplate 310, and may be in an open position when the head unit 305 is partially dislodged or fully removed from the backplate 310. The device 300 may include an accelerometer 330, which may be used to determine a removal and/or change in the orientation of the head unit 305 from the backplate 310 when, for example, the backplate switch 340 is in an open position as discussed in detail above. In some implementations, the sensor shown as accelerometer 330 may be substituted with or may include any suitable IMU sensor, gyroscope, and/or compass. In some implementations, the device 300 may include one or more of the components of premises management device 60 shown in FIG. 5 and described below.

A processor 350 may receive and analyze data obtained by the accelerometer 330 and the backplate switch 340. The processor 350 may control operation of other components of the device 300 and/or external devices, and process communication between the device 300 and other devices. The processor 350 may execute instructions and/or computer executable components stored on a computer-readable memory 360. Such computer executable components may include, for example, a primary function component to control a primary function of determining whether the movement and/or orientation of the device 300 represents a security issue and/or whether the device 300 is being tampered with, a communication component to locate and communicate with other compatible premises management devices, and a computational component to process system related tasks.

The memory 360 or another memory in the device 300 may also store environmental data obtained by the accelerometer 330 and/or any other sensor that may be part of the device 300. A communication interface 370, such as a WiFi, Thread, or other wireless interface, Ethernet or other local network interface, Bluetooth® or other radio interface, or the like may allow for transmission and receipt of data by the device 300 to and from other devices (e.g., the primary system processor 75 and/or the controller device 160 shown in FIG. 6, and/or the computing device 20 shown in FIG. 7).

A display 320 may provide information regarding the operational status of the device 300. For example, the display 320 may indicate whether the head unit 305 has been dislodged from a mounted position on backplate 310. In some implementations, the display 320 may be a touchscreen, and may receive user input. For example, the user may reset the device 300 when the head unit 305 is mounted to the backplate 310. In some implementations, the display 320 may include the LEDs 325 and/or a speaker to output an audible alarm when an event is detected by the device 300 (e.g., dislodgement and/or removal of the head unit 305 from the baseplate 310). Alternatively, or in addition, the display 320 and/or LEDs 325 may include a light to be activated when an event is detected by the device 300. For example, the display and/or the LEDs may indicate the status of the backplate switch 340 (e.g., whether the switch is open or closed). The user interface may be relatively minimal, such as a liquid crystal display (LCD), light-emitting diode (LED) display, or limited-output display, or it may be a full-featured interface such as a touchscreen, keypad, or selection wheel with a click-button mechanism to enter input.

Internal components of the device 300 may transmit and receive data to and from one another via an internal bus 380 or other mechanism, as will be readily understood by one of skill in the art. One or more components may be implemented in a single physical arrangement, such as where multiple components are implemented on a single integrated circuit. The device 300 as disclosed herein may include other components, and/or may not include all of the illustrative components shown.

A security system of a smart home network may attempt to detect a tampering of a device that may be mounted on a door, window, or other point of entry, while minimizing false tamper alerts due to mechanical and/or electrical contact issues (e.g., from force, vibrations, or the like). Implementations of the present disclosure generally relate to a system having features to detect a tampering on a device and additional features to decrease the likelihood of false tampering alerts based on mechanical and/or electrical connectivity issues. Upon detection of a tampering event, the presently disclosed system may output alert notifications to a user device, output an alarm, change a security mode, or the like.

The presently disclosed system may include a plurality of electrical and/or mechanical components, including intelligent, sensing, network-connected devices that communicate with each other and/or may communicate with a central server or a cloud-computing system to provide any of a variety of security (and/or environment) management objectives in a home, office, building or the like. Such operations, which may include, for example, managing alarms, notifying third parties of alert situations, managing door locks, monitoring the premises, etc., will collectively be referred to as "premises management." A premises management system as disclosed herein may further include subsystems that communicate with each other to manage different aspects of premises management aside from security. For example, a security system component may manage the arming, disarming, and activation of alarms and other security aspects of the premises, and a smart home component may handle environmental aspects such as light, temperature, and hazard detection of the premises.

The individual hardware components of the presently disclosed system that are used to monitor and affect the premises in order to carry out premises management will hereinafter be referred to as "premises management devices." The premises management devices described herein include multiple physical hardware and firmware configurations, along with circuitry hardware (e.g., processors, memory, etc.), firmware, and software programming that are capable of carrying out the presently described methods and functions of a premises management system, particularly a security component thereof having features to distinguish between a true smash-and-bash attack and a false alert.

The premises management devices may be controlled by a "brain" component, as described below, which may be implemented in a controller device. As such, the controller device is often the target of smash-and-bash attacks. In addition to the measures described herein, such attacks may be mitigated against in some implementations by distributing the brain component functionality among one or more premises management devices within the system as well as the controller device.

FIG. 4 shows an example premises management system 100, installed within a premises 110. The system 100 may include multiple types of premises management devices, such as one or more intelligent, multi-sensing, network-connected thermostats 120, one or more intelligent, multi-sensing, network-connected hazard detection units 130, one or more intelligent, multi-sensing, network-connected entry detection units 140, one or more network-connected door handles 150, and one or more intelligent, multi-sensing, network-connected controller devices 160.

Generally, the system 100 may be configured to operate as a learning, evolving ecosystem of interconnected devices. New premises management devices may be added, introducing new functionality or expanding existing functionality. Existing premises management devices may be replaced or removed without causing a failure of the system 100. Such removal may encompass intentional or unintentional removal of components from the system 100 by the user, as well as removal by malfunction (e.g., loss of power, destruction by intruder, etc.). In view of the dynamic nature of the system, the overall functionality and objectives of the system 100 may change as the constitution and configuration of the system 100 change.

In order to avoid contention and race conditions among the interconnected devices, certain decisions, such as those that affect the premises management system 100 at a system level or that involve data from multiple sources, may be centralized in the aforementioned "brain" component. The brain component may coordinate decision making across the system 100 or across a designated portion thereof. The brain component is a system element at which, for example, detector states converge, user interaction is interpreted, sensor data is received and decisions are made concerning the state of the system 100. Hereinafter, the system 100 brain component will be referred to as the "primary system processor." The primary system processor may be implemented in the controller device 160 and/or distributed among one or more premises management devices within the system.

The primary system processor may control subsystems and components of the premises management system, such as, for example, the security component and/or the smart home environment component. Furthermore, the primary system processor may control, receive data from, and transmit data to premises management devices within the system.

In the implementations disclosed herein, each of the premises management devices may include one or more sensors. In general, a "sensor" may refer to any device that can obtain information about its local environment and communicate that information in the form of data that may be stored or accessed by other devices and/or systems. Sensor data may form the basis of inferences drawn about the sensor's environment. For example, the controller device 160 and/or the primary system processor 75 may use data from a plurality of sensors and/or device 300 to determine whether a tampering event of a device of the premises management system is occurring, and to output notifications and/or an alarm.

A brief description of sensors that may be included in the system 100 follows. Examples provided are not intended to be limiting but are merely provided as illustrative subjects to help facilitate describing the subject matter of the present disclosure. The system 100 may use data from the types of sensors described below in order to detect unauthorized entry of a premises and/or tampering of a device of the premises management system, but the present disclosure is not limited to using the types of example sensors listed here. Rather, the system 100 may employ data from any type of sensor that provides data from which an inference may be drawn about the environment in or around the premises 100 and the vicinity of the controller device 160. Since it would be impractical to list and describe every type of possible sensor, it should be understood that sensors in general are known in the art and deployment of sensors not specifically described herein will be readily understood by one of ordinary skill on the art.

Generally, sensors may be described by the type of information they collect. For example, sensor types may include motion, smoke, carbon monoxide, proximity, temperature, time, physical orientation, acceleration, location, entry, presence, pressure, light, and sound, sensors and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof.

A sensor also may be described in terms of a function or functions the sensor performs within the system 100. For example, a sensor may be described as a security sensor when it is used to determine security events, such as unauthorized entry and/or tampering of a device of the premises management system.

A sensor may operate for different functions at different times. For example, system 100 may use data from a motion sensor to determine how to control lighting in the premises 100 when an authorized user is present and use the data to change a system security state on the basis of unauthorized or unexpected movement when no authorized user is present. In another example, the system 100 may use the motion sensor data differently when an alarm system is in an "armed" state versus an "unarmed" state.

In some cases, a sensor may operate as multiple sensor types sequentially or concurrently, such as where a temperature sensor is used to detect a change in temperature, as well as the presence of a person or animal. A sensor also may operate in different modes (e.g., different sensitivity or threshold settings) at the same or different times. For example, a sensor may be configured to operate in one mode during the day and another mode at night. As another example, a sensor may operate in different modes based upon a state of system 100, or as otherwise directed by the primary system processor.

Multiple sensors may be arranged in a single physical housing, such as where a single device includes movement, temperature, magnetic, and/or other sensors. Such a housing may also be referred to as a sensor or a sensor device. For clarity, sensors may be described with respect to the particular functions they perform and/or the particular physical hardware used, when such specification is beneficial for understanding of the implementations disclosed herein.

FIG. 5 shows an example premises management device 60 including a sensor 61 as disclosed herein. In some implementations, the device 300 shown in may include one or more of the components shown in device 60 and described below. The sensor 61 may be an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, compass or any other suitable environmental sensor, that obtains or provides a corresponding type of information about the environment in which the premises management device 60 is located. A processor 64 may receive and analyze data obtained by the sensor 61, control operation of other components of the premises management device 60 and/or external devices, and process communication between the premises management device 60 and other devices. The processor 64 may execute instructions and/or computer executable components stored on a computer-readable memory 65. Such computer executable components may include, for example, a primary function component to control a primary function of the premises management device 60 related to managing a premises, a communication component to locate and communicate with other compatible premises management devices, and a computational component to process system related tasks.

The memory 65 or another memory in the premises management device 60 may also store environmental data obtained by the sensor 61. A communication interface 63, such as a WiFi, Thread, or other wireless interface, Ethernet or other local network interface, Bluetooth® or other radio interface, or the like may allow for transmission and receipt of data by the premises management device 60 to and from other devices.

A user interface (UI) 62 may provide information and/or receive input from a user of system 100. The UI 62 may include, for example, a speaker to output an audible alarm when an event is detected by the premises management device 60. Alternatively, or in addition, the UI 62 may include a light to be activated when an event is detected by the premises management device 60. The user interface may be relatively minimal, such as a liquid crystal display (LCD), light-emitting diode (LED) display, or limited-output display, or it may be a full-featured interface such as a touchscreen, keypad, or selection wheel with a click-button mechanism to enter input.

Internal components of the premises management device 60 may transmit and receive data to and from one another via an internal bus 66 or other mechanism, as will be readily understood by one of skill in the art. One or more components may be implemented in a single physical arrangement, such as where multiple components are implemented on a single integrated circuit. Premises management devices 60 as disclosed herein may include other components, and/or may not include all of the illustrative components shown.

The sensor 61 may obtain data about the premises, and at least some of the data may be used to distinguishably identify a tampering and/or security event as described throughout. Through the bus 66 and/or communication interface 63, sensor data may be transmitted to or accessible by other components of the system 100. Generally, two or more sensors on one or more premises management devices may generate data that can be coordinated by the primary system processor to determine a system response and/or infer a state of the environment. In one example, the primary system processor of the system 100 may infer a state of intrusion based on data from entry detection sensors and motion sensors and, based on the determined state, further determine whether an intruder is present and whether a smash-and-bash attack is occurring.

Figure 6:
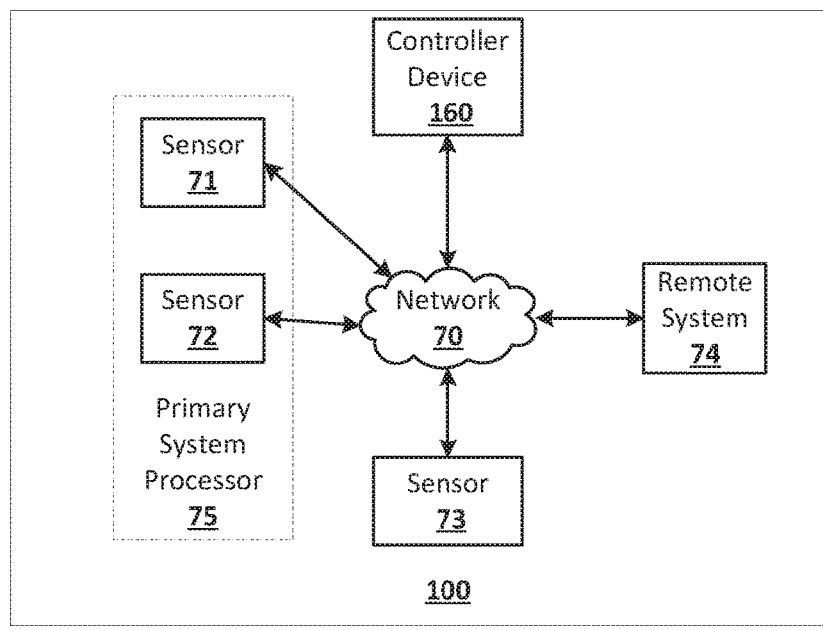
FIG. 6 shows a system according to an implementation of the disclosed subject matter.

FIG. 6 shows a diagram example of a premises management system 100 which may include device tampering detection features as disclosed herein. System 100 may be implemented over any suitable wired and/or wireless communication networks. One or more premises management devices, i.e., sensors 71, 72, 73, and one or more controller devices 160 (e.g., controller device 160 as shown in FIG. 6) may communicate via a local network 70, such as a WiFi or other suitable network, with each other. The network 70 may include a mesh-type network such as Thread, which provides network architecture and/or protocols for devices to communicate with one another. A user may therefore interact with the premises management system 100, for example, using the controller device 160 which communicates with the rest of the system 100 via network 70.

The controller device 160 and/or one or more of the sensors 71, 72, 73, may be configured to implement a primary system processor 75. The primary system processor 75 may, for example, receive, aggregate, and/or analyze environmental information received from the sensors 71, 72, 73, and the controller device 160. Furthermore, a portion or percentage of the primary system processor 75 may be implemented in a remote system 74, such as a cloud-based reporting and/or analysis system.

The sensors 71, 72, 73, may be disposed locally to one another, such as within a single dwelling, office space, building, room, or the like, or they may be disposed remote from each other, such as at various locations around a wide perimeter of a premises. In some implementations sensors 71, 72, 73, may communicate directly with one or more remote systems 74. The remote system 74 may, for example, aggregate data from multiple locations, provide instruction, software updates, and/or aggregated data to the primary system processor 75, controller device 160, and/or sensors 71, 72, 73. In addition, remote system 74 may refer to a system or subsystem that is a part of a third party monitoring service or a law enforcement service.

The premises management system shown in FIG. 6 may be a part of a smart-home environment. The smart-home environment may include a structure, such as a house, office building, garage, mobile home, or the like. The devices of the smart home environment, such as the sensors 71, 72, 73, and the network 70 may be integrated into a smart-home environment that does not include an entire structure, such as a single unit in an apartment building, condominium building, or office building.

The smart home environment can control and/or be coupled to devices both inside and outside of the premises structure. For example, one or more of the sensors 71, 72, 73, may be located outside the structure at one or more distances from the structure (e.g., sensors 71, 72, may be disposed at points along an extended driveway or land perimeter on which the structure is located, and the like). Likewise, the primary system processor 75 may be implemented in sensors located outside of the structure. The controller device 160 may also be implemented as a device integrated within the structure or as a free-standing device independent of the structure which the user may carry within or outside of the structure.

The structure of the smart-home environment may include a plurality of rooms, separated at least partly from each other via walls. Each room can further include a floor and a ceiling. Devices of the smart-home environment, such as the sensors 71, 72, 73, may be mounted on, integrated with and/or supported by a wall, floor, or ceiling of the structure.

Figure 7:
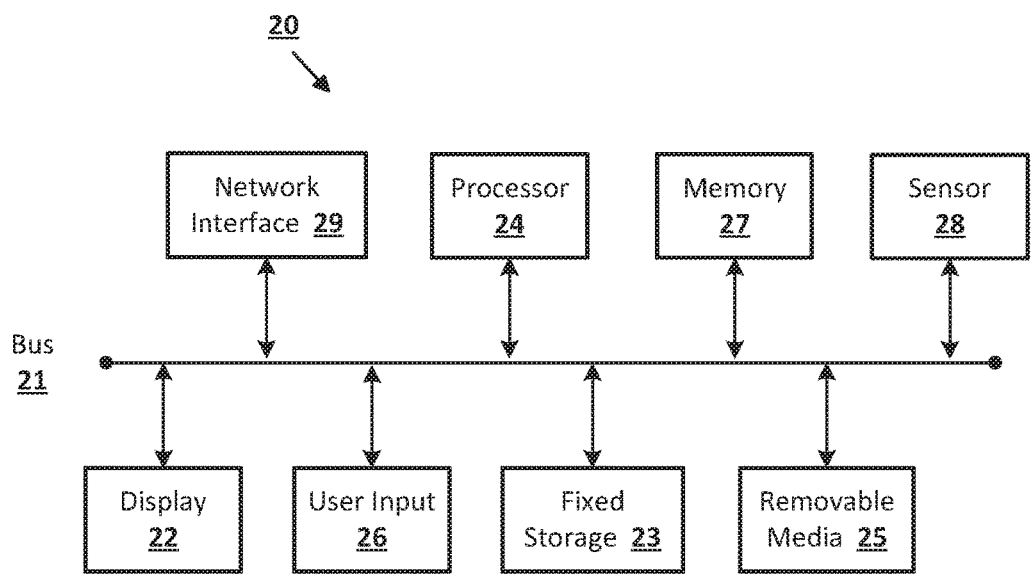
FIG. 7 shows a computing device according to an implementation of the disclosed subject matter.

FIG. 7 shows an example computing device 20 suitable for implementing certain elements that are a part of implementations of the presently disclosed subject matter. The computing device 20 may be used to implement, for example, the controller device 160 or a premises management device including sensors as disclosed above. The computing device 20 may be constructed as a custom-designed device or may be, for example, a special-purpose desktop computer, laptop computer, or mobile computing device such as a smart phone, tablet, or the like.

The computing device 20 may include a bus 21 that interconnects major components of the computing device 20, such as a central processor 24, a memory 27 such as Random Access Memory (RAM), Read Only Memory (ROM), flash RAM, or the like, a sensor 28, which may include one or more sensors as previously discussed herein, a user display 22 such as a display screen, a user input interface 26, which may include one or more user input devices such as a keyboard, mouse, keypad, touch screen, turn-wheel, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computing device 20 are generally stored on and accessed via a computer readable storage medium.

The fixed storage 23 may be integral with the computing device 20 or may be separate and accessed through other interfaces. The network interface 29 may provide a direct connection to the premises management system and/or a remote server via a wired or wireless connection. The network interface 29 may provide such connection using any suitable technique and protocol as will be readily understood by one of skill in the art, including digital cellular telephone, WiFi, Thread, Bluetooth®, near-field, and the like. For example, the network interface 29 may allow the computing device 20 to communicate with other components of the premises management system, other computers via one or more local, wide-area, or other communication networks, as described in further detail herein.

Referring to FIGS. 6 and 7, the computing device 20 may be used to implement a controller device 160 of the system 100. In an implementation as a controller device 160, the computing device 20 may include one or more sensors 28 to detect events and/or receive notifications that are indicative of a possible premises management device tampering. For example, sensor 28 may be a movement detector 28 to detect movement of the computing device 20. The movement detector 28 may be implemented as, for example, an accelerometer, a magnetic sensor and compass, a shock detector, a PIR, or the like. More generally, the movement detector 28 may include one or more sensors as disclosed herein or a combination of such sensors, sufficient to detect movement of the controller device.

The movement detector 28 may detect movement of the computing device 20 and generate data indicative of an intensity of any detected movement as well as a lack of movement. The computing device 20 may store the data in intervals on an on-going basis, for example, in fixed storage 23, removable media 25, or in a storage external to the computing device 20 via network interface 29. Moreover, movement data may be stored in association with a timestamp indicating a time that the data was generated. Immediately stored movement data, such as the most-recently stored data, may be referred to as "current movement data," while stored data which is no longer current may be referred to as "historical movement data." The current movement data and/or the historical movement data may include the set of trajectory of orientations that may be learned and/or pre-stored for a device, as discussed in detail above. The set may include the range of motion expected for a device.

Historical movement data may remain stored for a predetermined amount of time. For example, to conserve storage space the computing device 20 may be configured to store historical movement data for a period of one week, after which the data is deleted. This period of time may be adjusted by the user or automatically by the computing device 20 in accordance with available storage space.

The computing device 20 may estimate a range of normal movement of the computing device 20 based at least in part on the historical movement data. The estimation may be based on, for example, an average measure of intensity of movement per unit of time as indicated by the historical data for a given time period, plus or minus the standard deviation, or based on simpler or more complex algorithms/formulas. Moreover, the estimation method may be defined separately for different segments of the day, i.e., morning, noon, afternoon, evening, and night standards, and/or further take into account days of the week. For example, the normal movement range for Saturday afternoon, when the residents of a house are all at home, may be different than the normal movement range for a Monday afternoon, when all of the residents are typically out at school and work.

The computing device 20 may include multiple types of movement detectors 28. In such an implementation, the estimated range of normal movement may further be determined per sensor of the computing device 20. For example, a first sensor may be an accelerometer, which may frequently detect slight movements (e.g., when the computing device 20 is picked up and moved around) over a subject time period while a second sensor may be a shock detector which may rarely detect impact above a certain threshold (e.g., the computing device 20 is rarely dropped) during the same time period. A third sensor may be an anti-tamper sensor, which may never detect an attempt to pry open the computing device 20 over the same time period, thereby resulting in estimated ranges of normal movement unique for each sensor type.

The range estimation may be stored (e.g., as one or more values) and updated periodically on an on-going basis or updated on an event basis, for example, before deleting any historical movement data.

The current and historical movement data may also be accessible by the premises management system (i.e., by the primary system processor which handles computational tasks of the system). Based on the historical movement data, the premises management system may independently estimate a range of normal movement of the computing device 20 and/or access the range as defined by the computing device 20. For example, the primary system processor may have greater processing power and execute more complex algorithms to refine the range estimation. In either case, both the computing device 20 and the premises control system may have a data reference that represents an estimation of normal movement range of the computing device 20.

In addition, the estimate of the premises management system may take into account additional data available from sensors 71, 72, 73, external to the computing device 20. A range of normal movement that is estimated based on additional data obtained from sensors 71, 72, 73, outside of the computing device 20 may be referred to as an "extended estimation."

An extended estimation may factor in data obtained from sensors 71, 72, 73, of any of the premises management devices in the premises management system 100. The scope of the extended estimation is limited only by the availability of sensor data and the computational power available to the system for processing the data. Current and/or historical sensor data from any of the sensors 71, 72, 73, located in and/or around the premises may be associated, e.g., by time, with the historical movement data of the computing device 20, thereby allowing execution of algorithms which produce more complete estimations of normal movement. For example, the premises management system 100 may include one or more sensors 71, 72, 73, in each room of a premises. Based on periodic communication with these sensors 71, 72, 73, the location of the computing device 20 within the premises may be tracked. Data indicating a location of the computing device 20 may be referred to as "tracking data." Tracking data may also include a timestamp indicating a time that the tracking data was recorded.

Since tracking data may be associated with historical movement data having a corresponding timestamp, an extended estimation may define normal movement relative to a particular room of the premises. For example, if the computing device 20 is left in a family room or play room, certain acceleration movements, bumps, drops, etc. might be normal, whereas if the computing device 20 is left in a study, long periods of stillness might be normal. This is only one example use of external sensor data to supplement an extended estimation. Numerous other types of correspondence of data to produce an extended estimation are possible. An extended estimation may therefore include a matrix of data taking into account a plurality of factors representing a variety of aspects of the premises.

The accuracy of the normal range estimations and extended estimations may improve over time. As more data from the sensors 71, 72, 73, in the premises is generated, the system 100 better "learns" the normal conditions of the environment. Additional learning may occur by the premises management system 100 maintaining a record of the circumstances (e.g., time of day, location within the premises, etc.) of false smash-and-bash alarms as part of the extended estimation. Such a record may factor into evaluations of abnormal movement, as will now be described.

In some implementations, the premises management system 100 shown in FIG. 6 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72, 73, shown in FIG. 6. Thus, data may be obtained from a smart wall switch that may detect ambient lighting conditions for a primary function of controlling a power and/or dim state of one or more lights. For example, a sensor such as sensors 71, 72, 73, may detect ambient lighting conditions, and a device such as the controller device 160 may control the power to one or more lights (not shown) in the smart-home environment. Depending on the complexity of the evaluation algorithms, ambient lighting conditions may be a factor to consider in identifying unusual circumstances, e.g., consider whether the abnormal movement occurring in a dark room wherein there is normally no movement in darkness.

Data may also be obtained from smart wall switches that may also control a power state or speed of a fan, such as a ceiling fan. For example, sensors 71, 72, 73, may detect the power and/or speed of a fan, and the controller device 160 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

The smart-home environment of the sensor network shown in FIG. 6 can include one or more intelligent, multi-sensing, network-connected doorknobs (e.g., "smart doorknob"). For example, the sensors 71, 72, 73, may be coupled to a doorknob of a door (e.g., doorknobs 122 located on external doors of the structure of the smart-home environment). However, it should be appreciated that smart doorknobs can be provided on external and/or internal doors of the smart-home environment. Data about the status of the doorknobs may be obtained a combined with other data to infer a state of a room or the premises.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72, 73, of FIG. 3) can be communicatively coupled to each other via the network 70, and to the controller device 160 and/or remote system 74 to provide security, safety, and/or comfort for the smart home environment. However, these and other elements may be used for the secondary purpose of distinguishing smash-and-bash attacks.

The system 100 may obtain data from one or more of the network-connected smart devices, however, the user also may interact with such devices (e.g., via the network 70). For example, a user can communicate using computing device 20 (e.g., in the form of controller device 160), a portable electronic device (e.g., a smartphone, a tablet, a key FOB, or the like), or a computer (e.g., a desktop computer, laptop computer, tablet, or the like). A webpage or application can be configured to receive communications from the user and control the one or more of the network-connected smart devices based on the communications and/or to present information about the device's operation to the user. For example, the user can view, arm or disarm the security system of the home. Similarly, the user may also access a report of the sensor data. The system 100 may provide control functions related to the sensor data, for example, to limit the length of time sensor data is stored, to clear caches for privacy concerns, or to disable the storing of data.

Furthermore, more than one user may control one or more of the network-connected smart devices in the smart-home environment using a network-connected computer or portable electronic device. In some examples, some or all of the users (e.g., individuals who live in the home) can register their mobile device and/or key FOBs with the smart-home environment. Such registration can be made via the controller device 160, a computer in communication with the system 100, and/or a central server such as the remote system 74. Registration may be used to authenticate the users and/or their electronic devices as being associated with the smart-home environment, and to provide permission to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment. Such a use may be an event that generates data which may be used in evaluating alerts from the computing device 20, e.g., the use may indicate the presence of an authorized individual.

Alternatively, or in addition to registering electronic devices, the smart-home environment may make inferences about which individuals live in the home and are therefore users and which electronic devices are associated with those individuals. The smart-home environment may "learn" who is a user (e.g., an authorized individual) and permit the electronic devices associated with those individuals to control the network-connected smart devices of the smart-home environment (e.g., devices communicatively coupled to the network 70). In this implementation, various types of notices and other information, such as the verification response sent after an evaluation results in an intermediate event score, may be provided to users via messages sent to one or more user electronic devices. For example, the messages can be sent via email, short message service (SMS), multimedia messaging service (MIMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to the system 100 or a cloud-computing system (e.g., remote system 74) regarding detected movement and/or presence of people, animals, and any other objects and receives back commands for controlling the lighting accordingly. It follows that data of such detections may be used as a factor in evaluating alerts from the computing device 20.

In some configurations, a remote system 74 may aggregate data from multiple locations, such as multiple buildings, multi-resident buildings, individual residences within a neighborhood, multiple neighborhoods, and the like. In general, sensors 71, 72, 73, and/or controller device 160 as previously described with respect to FIG. 6 may provide information to the remote system 74. The system 100 may provide data directly from one or more sensors as previously described, or the data may be aggregated and/or analyzed by local controllers such as the primary system processor 75, which then communicates with the remote system 74. The remote system 74 may aggregate and analyze the data from multiple locations, and may provide aggregate results to each location. For example, the remote system 74 may examine larger regions for common sensor data or trends in sensor data, and provide information on the identified commonality or environmental data trends to each local system 100. Such trend data may also be used as factors in evaluating alerts from the computing device 20.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   determining, at a controller of a device of a premises management system, the device having a head unit and a backplate, at least a partial removal of the head unit from the backplate based on a position of a removal switch that detects connectivity between the head unit and the backplate;
   when the controller determines that the position of the removal switch is in an open position, continuously determining, at the controller, an orientation of the head unit based on an output signal from an accelerometer coupled to the head unit;

determining, at the controller, whether the orientation of the head unit is within a predetermined range of orientations; and outputting, at the controller, a tampering signal based on the open position of the backplate removal switch, the determined orientation of the head unit, and when the determined orientation is outside of the predetermine range of orientations.

2. The method of claim 1, wherein the controller determines that the position of the removal switch is in a closed position by determining a first average of a first vector for a first predetermined period of time.

3. The method of claim 2, wherein the controller continuously determines the orientation of the head unit for a second average of a second vector for a second period of time that is less than the first period of time.

4. The method of claim 3, wherein the determining the orientation comprises determining a 1-norm between the first vector and the second vector.

5. The method of claim 4, wherein the outputting the tampering signal comprises:

outputting the tampering signal when the determined 1-norm exceeds a predetermined threshold value.

6. The method of claim 1, further comprising:

when the change in orientation of the head unit exceeds a predetermined value, outputting the tampering signal from the controller based on the open position of the removal switch.

7. The method of claim 6, further comprising:

outputting at least one from the group consisting of: a notification to a user device and an alarm based on the outputted tampering signal.

8. The method of claim 1, wherein the continuously determining of the orientation of the head unit comprises:

continuously determining, at the controller, an orientation of the head unit based on an output signal from one or more sensors.

9. The method of claim 8, wherein the one or more sensors are selected from a group consisting of: a gyroscope, a compass, and an inertial movement unit (IMU).

10. The method of claim 1, further comprising:

determining, at the controller, the predetermined range of orientations for the device based on a range of movement of the device in a mounted location.

11. A device for a premises management system comprising:

a head unit coupled to a backplate;

a removal switch to detect connectivity between the head unit and the backplate;

an accelerometer to determine an orientation of the head unit; and a controller to determine at least a partial removal of the head unit from the backplate based on a position of the removal switch, and when the controller determines that the position of the removal switch is in an open position, the controller continuously determines an orientation of the head unit based on an output signal from an accelerometer and determines whether the orientation of the head unit is within a predetermined range of orientations, and the controller outputs a tampering signal based on the open position of the backplate removal switch, the determined orientation of the head unit, and when the determined orientation is outside of the predetermine range of orientations.

12. The device of claim 11, wherein the controller determines that the position of the removal switch is in a closed position by determining a first average of a first vector for a first predetermined period of time.

13. The device of claim 12, wherein the controller continuously determines the orientation of the head unit for a second average of a second vector for a second period of time that is less than the first period of time.

14. The device of claim 13, wherein the controller determines a 1-norm between the first vector and the second vector.

15. The device of claim 14, wherein the controller outputs the tampering signal when the determined 1-norm exceeds a predetermined threshold value.

16. The device of claim 11, wherein the controller outputs the tampering signal based on the open position of the removal switch when the change in orientation of the head unit exceeds a predetermined value.

17. The device of claim 16, wherein the controller outputs at least one from the group consisting of: a notification to a user device and an alarm based on the outputted tampering signal.

18. The device of claim 11, wherein the controller continuously determines an orientation of the head unit based on an output signal from one or more sensors.

19. The device of claim 18, wherein the one or more sensors are selected from a group consisting of: a gyroscope, a compass, and an inertial movement unit (IMU).

20. The method of claim 11, wherein the controller determines the predetermined range of orientations for the device based on a range of movement of the device in a mounted location.

* * * * *